(12) United States Patent
Qiu

(10) Patent No.: US 11,039,685 B2
(45) Date of Patent: Jun. 22, 2021

(54) TRANSMISSION ASSEMBLY, POWER UNIT AND LIFTING CABINET

(71) Applicant: CMECH (GUANGZHOU) LTD., Guangdong (CN)

(72) Inventor: Jia Sen Qiu, Guangdong (CN)

(73) Assignee: CMECH (GUANGZHOU) LTD., Guangdong (CN)

( * ) Notice: Subject to any disclaimer, the term of this patent is extended or adjusted under 35 U.S.C. 154(b) by 0 days.

(21) Appl. No.: 16/695,789

(22) Filed: Nov. 26, 2019

(65) Prior Publication Data
US 2021/0037967 A1    Feb. 11, 2021

(30) Foreign Application Priority Data

Aug. 5, 2019 (CN) .......................... 201910717730.6
Aug. 5, 2019 (CN) .......................... 201910718438.6
(Continued)

(51) Int. Cl.
*A47B 51/00* (2006.01)
*A47B 57/06* (2006.01)
(Continued)

(52) U.S. Cl.
CPC ............. *A47B 51/00* (2013.01); *A47B 57/06* (2013.01); *A47B 97/00* (2013.01); *B66D 1/12* (2013.01);
(Continued)

(58) Field of Classification Search
CPC . A47B 51/00; A47B 97/00; A47B 2220/0002; F16H 25/20; F16H 25/2204; F16H 2025/2084
See application file for complete search history.

(56) References Cited

U.S. PATENT DOCUMENTS 2,499,791 A  *  3/1950  Spencer ................. A47B 51/00
                                                   312/247
4,239,440 A  *  12/1980 James .................... B60P 1/4435
                                                   414/540
(Continued)

FOREIGN PATENT DOCUMENTS

AT            514056 A4    10/2014
CN         201088284 Y     7/2008
(Continued)

*Primary Examiner* — Hanh V Tran
(74) *Attorney, Agent, or Firm* — McKee, Voorhees & Sease, PLC

(57) ABSTRACT

A lifting cabinet includes a transmission assembly and a power unit for raising and lowering a shelf. The transmission assembly comprises a first transmission unit, comprising a screw rod which is connected with a driving device and a sliding piece which is connected with the lifting shelf, and the sliding piece is coupled to the screw rod. The screw rod rotates under the action of the driving device and drives the sliding piece to move back and forth along the axis of the screw rod; and then the sliding piece drives the lifting shelf to move up and down. For the lifting cabinet and the power unit thereof, the transmission assembly converts a rotary motion outputted from the driving device into a linear motion through the cooperation between the screw rod and the sliding piece, and a greater axial force is thereby outputted. Thus, a relatively small motor with a lower output torque can be used in the lifting cabinet to drive a lifting shelf of the same weight when compared to the conventional lifting cabinet, and the problem of large motor in conventional lifting cabinet taking up too much space is thereby solved.

20 Claims, 3 Drawing Sheets

(30) Foreign Application Priority Data

Aug. 5, 2019 (CN) .......................... 201910718446.0
Aug. 5, 2019 (CN) .......................... 201921261566.4

(51) Int. Cl.

| | | |
|---|---|---|
| A47B 97/00 | (2006.01) | |
| F16H 25/20 | (2006.01) | |
| F16H 25/22 | (2006.01) | |
| B66D 1/12 | (2006.01) | |
| B66D 1/20 | (2006.01) | |
| B66D 1/26 | (2006.01) | |
| B66D 1/30 | (2006.01) | |
| B66D 1/36 | (2006.01) | |
| B66D 1/60 | (2006.01) | |
| B66D 3/18 | (2006.01) | |
| B66D 3/26 | (2006.01) | |

(52) U.S. Cl.
CPC .............. *B66D 1/20* (2013.01); *B66D 1/26* (2013.01); *B66D 1/30* (2013.01); *B66D 1/36* (2013.01); *B66D 1/60* (2013.01); *B66D 3/18* (2013.01); *B66D 3/26* (2013.01); *F16H 25/20* (2013.01); *F16H 25/2204* (2013.01); *A47B 2220/0002* (2013.01); *A47B 2220/0091* (2013.01)

(56) References Cited

U.S. PATENT DOCUMENTS

| | | | | |
|---|---|---|---|---|
| 5,667,035 | A * | 9/1997 | Hughes | B66F 7/02 182/142 |
| 6,676,233 | B1 * | 1/2004 | Evans | B66B 9/02 108/147.11 |
| 7,416,055 | B2 * | 8/2008 | Penn | B66B 11/06 182/141 |
| 9,120,645 | B2 * | 9/2015 | Penn | B66B 1/3461 |
| 9,277,823 | B2 * | 3/2016 | Griggs, Jr. | A47C 7/00 |
| 9,486,911 | B1 * | 11/2016 | Liu | B25H 1/16 |
| 10,598,426 | B2 * | 3/2020 | Kang | F25D 25/025 |
| 10,801,594 | B2 * | 10/2020 | Burgess | F16H 25/20 |
| 2005/0184546 | A1 * | 8/2005 | Kunz | A47B 21/0073 296/26.01 |
| 2006/0066188 | A1 * | 3/2006 | Crawford | E04B 9/003 312/247 |
| 2007/0108791 | A1 * | 5/2007 | Okninski | A47B 81/064 296/97.12 |
| 2008/0143219 | A1 * | 6/2008 | Free | A47B 81/064 312/7.2 |
| 2008/0289264 | A1 * | 11/2008 | Bowman | A47B 51/00 52/29 |
| 2009/0021128 | A1 * | 1/2009 | Greenberg | A47B 51/00 312/237 |
| 2009/0110528 | A1 * | 4/2009 | Walter | B60P 3/39 414/609 |
| 2010/0045152 | A1 * | 2/2010 | Bond | A47B 46/005 312/319.1 |
| 2010/0320352 | A1 * | 12/2010 | Weber | F16H 25/20 248/429 |
| 2011/0067511 | A1 * | 3/2011 | Pettersson | F16H 25/2015 74/89.28 |
| 2011/0068669 | A1 * | 3/2011 | Hollenstein | E05D 15/40 312/319.1 |
| 2011/0221317 | A1 * | 9/2011 | Bruestle | A47B 51/00 312/247 |
| 2012/0227524 | A1 * | 9/2012 | Takahashi | H02K 11/215 74/89.34 |
| 2013/0088131 | A1 * | 4/2013 | Messing | A47B 51/00 312/247 |
| 2013/0241384 | A1 * | 9/2013 | Strauss | A47B 51/00 312/319.5 |
| 2014/0159410 | A1 * | 6/2014 | Rasmussen | A47C 17/34 296/24.33 |
| 2014/0196555 | A1 * | 7/2014 | Wu | F16H 25/20 74/89.23 |
| 2014/0252930 | A1 * | 9/2014 | Reid | A47B 51/00 312/247 |
| 2015/0208805 | A1 * | 7/2015 | Griggs, Jr. | A47C 1/03222 297/463.1 |
| 2015/0345600 | A1 * | 12/2015 | Garrec | F16H 25/24 74/89.27 |
| 2016/0198853 | A1 * | 7/2016 | Liu | A47B 96/18 312/317.3 |
| 2016/0278517 | A1 * | 9/2016 | DeLorean | E04B 9/02 |
| 2017/0002905 | A1 * | 1/2017 | Sessions | F16H 25/20 |
| 2017/0167312 | A1 * | 6/2017 | Son | F16H 25/10 |
| 2017/0251818 | A1 * | 9/2017 | Andersen | F16H 37/12 |
| 2018/0084906 | A1 * | 3/2018 | Finch, Jr. | B66F 7/02 |
| 2019/0195339 | A1 * | 6/2019 | Kim | F16H 59/044 |
| 2019/0207468 | A1 * | 7/2019 | Chen | B25J 17/02 |
| 2019/0216220 | A1 * | 7/2019 | Griggs, Jr. | A47C 1/03211 |
| 2019/0219324 | A1 * | 7/2019 | Kang | F25D 25/022 |
| 2019/0374023 | A1 * | 12/2019 | Allen | A47B 17/02 |
| 2020/0130809 | A1 * | 4/2020 | Tsai | B64C 3/38 |
| 2020/0347889 | A1 * | 11/2020 | Amemiya | F16C 29/0695 |
| 2020/0361426 | A1 * | 11/2020 | Wang | F16H 25/20 |
| 2020/0369188 | A1 * | 11/2020 | Samain | B60N 2/865 |

FOREIGN PATENT DOCUMENTS

| | | |
|---|---|---|
| CN | 201480544 U | 5/2010 |
| CN | 202737328 U | 2/2013 |
| CN | 203885023 U | 10/2014 |
| CN | 203934851 U | 11/2014 |
| CN | 203934862 U | 11/2014 |
| CN | 204132770 U | 2/2015 |
| CN | 104466831 A | 3/2015 |
| CN | 205018553 U | 2/2016 |
| CN | 105595641 A | 5/2016 |
| CN | 109276039 A | 1/2019 |
| CN | 109733994 A | 5/2019 |
| CN | 109795952 A | 5/2019 |
| CN | 208988054 U | 6/2019 |
| CN | 109984467 A | 7/2019 |
| GB | 2557699 A | 6/2018 |
| JP | 2014226508 A | 12/2014 |
| KR | 200414468 Y1 | 4/2006 |
| KR | 20130138069 A | 12/2013 |
| KR | 101407534 B1 | 6/2014 |
| WO | 2010130570 A1 | 11/2010 |

* cited by examiner

TRANSMISSION ASSEMBLY, POWER UNIT AND LIFTING CABINET

PRIORITY CLAIMS AND INCORPORATION OF RELATED APPLICATIONS

This application claims priority to the following four Chinese applications, and incorporate by reference their related pending US applications in their entireties:

(A) Chinese application 201910717730.6, filed Aug. 5, 2019;

(B) Chinese application 201921261566.4, filed Aug. 5, 2019 and U.S. Ser. No. 16/695,659, filed Nov. 26, 2019, MVS Ref No. P13067US00;

(C) Chinese application 201910718446.0, filed Aug. 5, 2019, and U.S. Ser. No. 16/695,655, filed Nov. 26, 2019, MVS Ref No. P13068US00;

(D) Chinese application 201910718438.6, filed Aug. 5, 2019, and U.S. Ser. No. 16/695,850, filed Nov. 26, 2019, MVS Ref No. P13070US00.

FIELD OF THE INVENTION

The following relates to the field of cabinets, and more particularly to a transmission assembly, a power unit, and a lifting cabinet.

BACKGROUND OF THE INVENTION

With the development of urbanization, most of the residential buildings are small-sized. In order to ensure enough storage space, people often make good use of the unused upper space, for example, a hanging wall-mounted cabinet or storage chamber is mounted in the house to improve the space utilization. However, it is very troublesome to take items out from or put them in the cabinet or storage chamber which is located in a high place, and this cannot perfectly meet the needs of people of different heights.

To solve the problems above, an automatically lifting cabinet comprises a cabinet body having an openable bottom, from where a lifting shelf installed inside the body can be lowered out. The lifting cabinet in the prior art operates by raising and lowering a lifting shelf by a belt pulley which is driven by a motor. Due to the heavy load on the lifting shelf, a motor with greater power is required to be equipped within the lifting cabinet such that smooth raising and lowering of the lifting shelf can be ensured if the shelf is loaded. However, the motor with greater power has a relatively larger dimension and occupies more space which results in less space for storage in the cabinet.

SUMMARY OF THE INVENTION

It is an objective of the invention to provide a transmission assembly of a lifting cabinet so that a small motor can be used in the lifting cabinet instead of a large motor.

A transmission assembly is provided for a lifting cabinet, comprising a first transmission unit with a screw rod which is connected with a driving device and a sliding piece which is connected with the lifting shelf.

The sliding piece is coupled to the screw rod.

The screw rod rotates under the action of the driving device and drives the sliding piece to move back and forth along the axis of the screw rod, thereby the sliding piece drives the lifting shelf to move up and down.

The transmission assembly of the lifting cabinet according to the present invention converts a rotary motion outputted from the driving device into a linear motion through the cooperation between the screw rod and the sliding piece, and the driving device outputting greater axial force consequently. Thus, a relatively small motor with a lower output torque can be used in the lifting cabinet to drive a lifting shelf of the same weight when compared to the conventional lifting cabinet, and the problem of large motor in conventional lifting cabinet taking up too much space is thereby solved.

In one embodiment, the screw rod is a ball screw, and the sliding piece is a transmission nut. A ball passage is formed between the ball screw and the transmission nut, and a plurality of balls are arranged therein.

In the transmission assembly of the lifting cabinet according to the present invention, the screw rod is a ball screw, the sliding piece is a transmission nut, and a plurality of balls are arranged in a ball passage formed between the ball screw and the transmission nut. Compared with the prior art where a gear drives a transmission shaft and the transmission shaft drives a belt pulley to rotate, a greater output axial thrust is created from the first transmission unit if the same torque is outputted, through the cooperation between the ball screw and the transmission nut, so that a smaller motor is sufficient to be used in the lifting cabinet.

Further, the sliding piece is further configured with a transmission wheel, and a flexible connecting piece is coiled on the transmission wheel for connecting with the lifting shelf.

When the transmission wheel moves along with the sliding piece, the flexible connecting piece drives the lifting shelf to move up and down.

The transmission assembly of the lifting cabinet according to the present invention operates by providing transmission wheels on the sliding piece and coiling a flexible connecting piece for connecting the lifting shelf on the transmission wheel. When the sliding piece moves back and forth driven by the ball screw, the transmission wheel moves along with it as well, meanwhile, the lifting shelf is thereby driven by the flexible connecting piece to move as the transmission wheel moves. Moreover, the transmission wheel bears constant pull by the flexible connecting piece when the load on the lifting shelf stays unchanged, so that the lifting shelf moves more smoothly.

Further, the transmission assembly of the lifting cabinet also comprises a fixture which is secured inside the cabinet body of the lifting cabinet. One end of the flexible connecting piece is secured to the fixture, and the other end is secured to the lifting shelf.

The transmission assembly of the lifting cabinet according to the present invention operates by fixing a fixture inside the cabinet body of the lifting cabinet, and securing the two ends of the flexible connecting piece to the lifting shelf and the fixture respectively, so that the pull of the flexible connecting piece is partly transferred to the cabinet body of the cabinet, in order to prevent the flexible connecting piece detaching from the lifting shelf.

Further, a steering wheel is further provided on the fixture.

The sliding piece is configured with two transmission wheels, each of which is configured with one set of flexible connecting piece coiled thereon, and wherein one of the sets of the flexible connecting pieces is coiled on the steering wheel to make a turn.

In the transmission assembly of the lifting cabinet according to the present invention, it is provided a steering wheel on the fixture and two transmission wheels on the sliding piece; two sets of flexible connecting piece connecting with the lifting shelf are coiled on the two transmission wheels respectively, and one set of the flexible connecting piece makes a turn by being coiled on the steering wheel, so that the two sets of flexible connecting piece are connected to the two sides of the lifting shelf respectively, and the two sides of the lifting shelf are subjected to identical pull force in a same direction, thus the lifting shelf moves more smoothly.

Further, the transmission assembly of the lifting cabinet further comprises a second transmission unit, the input of which is connected with the driving device and the output is connected with the first transmission unit;

The second transmission unit is used for receiving a first torque outputted from the driving device and outputting a second torque to the first transmission assembly according to the first torque.

The directions of the first torque and the second torque are different.

The transmission assembly of the lifting cabinet according to the present invention operates by providing a second transmission unit between the driving device and the first transmission unit, and the second transmission unit outputting a second torque in a different direction from the first torque, so that the first transmission unit and the driving device can be arranged in the same plane, and the first transmission unit and the driving device can be connected in a shape of "L", thus a reasonable layout and space saving is achieved.

Specifically, the second transmission unit comprises a second gear with first and second gear rings being coaxially arranged thereon.

The first gear ring is connected with the driving device, and the second gear ring is connected with a cone gear arranged on the screw rod.

Specifically, a first gear is connected between the first gear ring and the driving device.

Preferably, the second torque is greater than the first torque.

In the transmission assembly of the lifting cabinet according to the present invention, the second transmission assembly outputs a greater second torque compared with a first torque outputted from the driving device, so that a greater axial force outputted from the first transmission unit is achieved.

Another objective of the invention is to provide a power unit for a lifting cabinet, comprising a driving device and the transmission assembly of lifting cabinet as described above.

Another objective of the invention is to provide a lifting cabinet, comprising a power unit as described above.

Embodiments of the invention will be described in detail, with references to the following figures, for a better understanding and practice.

Figure 1:
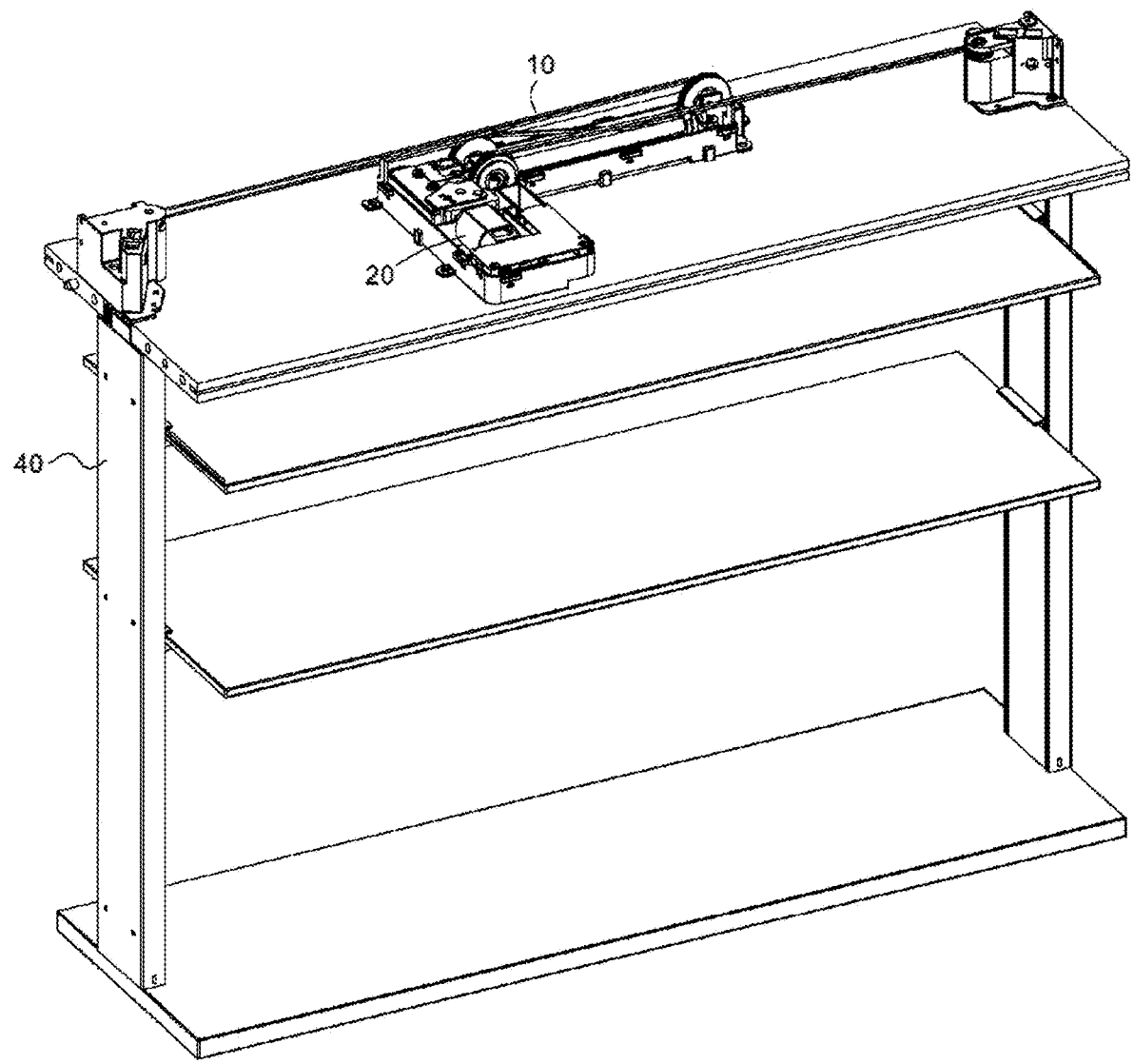
FIG. 1 is a top view of an embodiment of the lifting cabinet with the roof removed according to the present invention.

LIST OF REFERENCE NUMBERS 10 first transmission unit
11 screw rod
12 sliding piece
13 transmission wheel
14 flexible wire rope
15 fixture
16 steering wheel
20 second transmission unit
21 first gear
22 second gear
23 cone gear
30 driving device
31 motor
32 gear box
40 shelf

DETAILED DESCRIPTION OF THE PREFERRED EMBODIMENTS

Embodiments of the invention will be described in detail in purpose of explanation, with references to the following figures.

Figure 2:
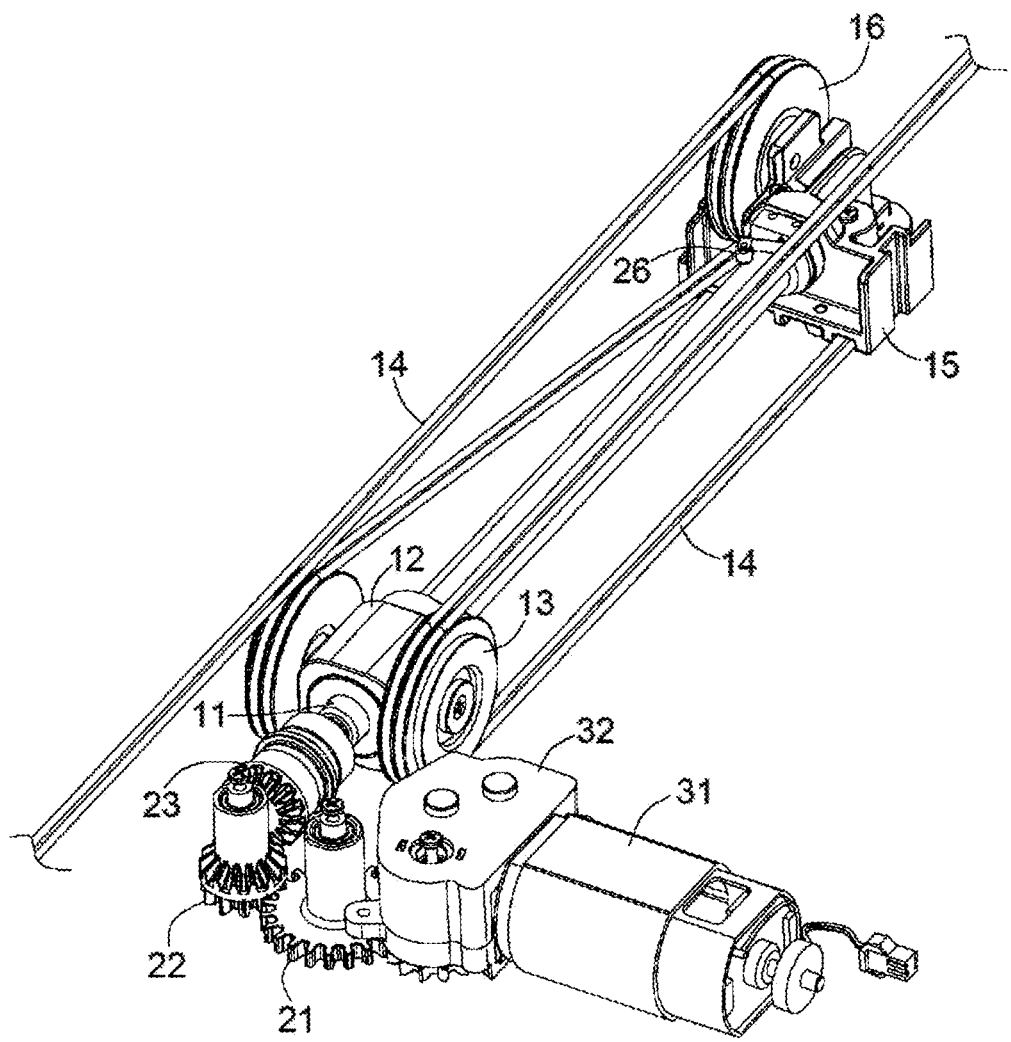
FIG. 2 is a structural schematic view of an embodiment of the power unit for the lifting cabinet according to the present invention.

As illustrated in FIG. 1, a transmission assembly for a lifting cabinet, comprises a first transmission unit 10. As illustrated in FIG. 2, the first transmission unit 10 comprises a screw rod 11 which is connected with a driving device 30, and a sliding piece 12 which is connected with a lifting shelf 40. The sliding piece 12 is coupled to the screw rod 11.

The screw rod 11 rotates under the action of the driving device 30 and drives the sliding piece 12 to move back and forth linearly along the axis of the screw rod 11. The sliding piece 12 drives the lifting shelf 40 to move up and down.

In an embodiment, the transmission assembly of the lifting cabinet according to the present invention converts a rotary motion created by the driving device into a linear motion through the cooperation between the screw rod and the sliding piece, and a greater axial thrust is thereby outputted. Thus, a relatively small motor with a lower output torque can be used in the lifting cabinet to drive a lifting shelf of the same weight when compared to the conventional lifting cabinet, and the problem of large motor in conventional lifting cabinet taking up too much space is thereby solved.

Specifically, the screw rod 11 is a ball screw, and the sliding piece 12 is a transmission nut, a ball passage is formed between the ball screw and the transmission nut, and a plurality of balls are arranged therein. It should be noted that, the ball passage and the balls are not shown in the accompanying drawings without causing any misunderstanding.

For the transmission assembly of the lifting cabinet according to the present invention, a greater output axial thrust is created from the first transmission unit if the same torque is outputted, through the cooperation between the ball screw and the transmission nut, so that a smaller motor is sufficient to be used in the lifting cabinet.

In the prior art, a motor drives a gear, which thereby drives a belt pulley to rotate. The axial force $F_1$ produced by the belt pulley complies with the formula $$F_1 = \frac{T}{l_1},$$

wherein the T is the torque of the belt pulley, $l_1$ is the arm of force on the belt pulley. If T=5 N·m, $l_1$=5 mm, the axial force (i.e. the pull force exerted on the lifting shelf) produced by the belt pulley will be 1000 N.

In comparison, the axial force $F_2$ produced by cooperation between the ball screw and transmission nut complies with the formula $$F_2 = \frac{2\pi T}{p},$$

wherein the p is the lead of the ball screw (i.e. a distance that the transmission nut travels after it rotates in one complete circle relative to the ball screw). If p=5 mm, and the transmission efficiency is 80%, the axial force produced by the cooperation between the ball screw and the transmission nut will be 5024 N.

It can be seen that the axial force produced by the cooperation between the ball screw and the transmission nut will be at least 5 times the axial force that produced by the belt pulley, if the torque is the same.

Preferably, the sliding piece 12 is further configured with transmission wheels 13, as illustrated in FIG. 1 and FIG. 2, and a flexible connecting piece 14 coiled or wrapped on the transmission wheel 13 is provided for connecting with the lifting shelf 40.

When the transmission wheel moves along with the sliding piece, the flexible connecting piece drives the lifting shelf to move up and down.

Specifically, the flexible connecting piece 14 is a steel wire rope or cable.

The transmission assembly of the lifting cabinet according to the present invention operates by providing transmission wheels 13 on the sliding piece 12 and coiling a flexible connecting piece 14 for connecting the lifting shelf on the transmission wheel. When the sliding piece 12 moves back and forth driven by the ball screw 11, the transmission wheel 13 moves along with it as well, meanwhile, the lifting shelf is thereby driven by the flexible connecting piece 14 to move as the transmission wheel moves. Moreover, the transmission wheel 13 bears constant pull by the flexible connecting piece 14 when the load on the lifting shelf stays unchanged, so that the lifting shelf moves more smoothly.

Preferably, as illustrated in FIG. 2, the transmission assembly of the lifting cabinet further comprises a fixture 15 which is secured inside the cabinet body 40 of the lifting cabinet. One end of the flexible connecting piece 14 is secured to the fixture 15, and the other end is secured to the lifting shelf 40.

The transmission assembly of the lifting cabinet according to the present invention operates by fixing the fixture 15 inside the cabinet body of the lifting cabinet, and securing the two ends of the flexible connecting piece 14 to the lifting shelf and the fixture respectively, so that the pull of the flexible connecting piece is partly transferred to the cabinet body of the cabinet, in order to prevent the flexible connecting piece 14 detaching from the lifting shelf.

Preferably, as illustrated in FIG. 2, a steering wheel 16 is further provided on the fixture 15.

The sliding piece 12 is configured with two transmission wheels 13, each of which is configured with a set of flexible connecting piece 14 coiled thereon, and one set of the flexible connecting piece 14 is coiled on the steering wheel 16 to make a turn.

In the transmission assembly of the lifting cabinet according to the present invention, it is provided a steering wheel 16 on the fixture 15 and two transmission wheels 13 on the sliding piece 12; two sets of flexible connecting piece 14 connecting with the lifting shelf are coiled on the two transmission wheels 13 respectively, one set of the flexible connecting piece 14 makes a turn by being coiled on the steering wheel 16, so that the two sets of flexible connecting pieces 14 are connected to the two sides of the lifting shelf respectively, and the two sides of the lifting shelf are subjected to identical pull force in a same direction, thus the lifting shelf moves more smoothly.

Preferably, the transmission assembly of the lifting cabinet further comprises a second transmission unit 20, the input of which is connected with the driving device and the output is connected with the first transmission unit 10.

The second transmission unit 20 is used for receiving a first torque outputted from the driving device 30 and outputting a second torque to the first transmission unit 10 according to the first torque, wherein the directions of the first torque and the second torque are different.

The transmission assembly of the lifting cabinet according to the present invention operates by providing a second transmission unit 20 between the driving device 30 and the first transmission unit 10, and the second transmission unit 20 outputting a second torque in a different direction from the first torque, so that the first transmission unit 10 and the driving device 30 can be arranged in the same plane, and the first transmission unit 10 and the driving device 30 can be connected in a shape of "L", thus a reasonable layout and space saving is achieved.

Specifically, the second transmission unit 20 comprises a second gear 22 with first and second gear rings being coaxially arranged thereon.

The first gear ring is connected with the driving device 30, and the second gear ring is connected with a cone gear 23 arranged on the screw rod 11, in order to change the direction of the output torque.

Specifically, a first gear 21 is connected between the first gear ring and the driving device 30.

The first gear 21 has a larger diameter than the output gear in the reduction gearbox for the driving device 30, therefore, the first gear 21 outputs a greater torque than the reduction gearbox for the driving device.

Preferably, the second torque is greater than the first torque.

In the transmission assembly of the lifting cabinet according to the present invention, the second transmission assembly outputs a greater second torque compared with a first torque outputted from the driving device, so that a greater axial force output from the first transmission unit is achieved.

Moreover, the second gear 22 has both straight teeth and conical teeth, and the second gear 22 is engaged with the first gear 21 and the cone gear 23 which is connected to the screw rod 11, respectively, in this way, the direction of the output torque from the driving device is changed.

A power unit for a lifting cabinet is provided in an embodiment, comprising a driving device 30 and transmission assembly as described above.

Specifically, the driving device 30 comprises a small motor 31 and a reduction gearbox 32 connected thereto.

A lifting cabinet is provided in an embodiment, comprising a power unit for the lifting cabinet as described above.

Figure 3:
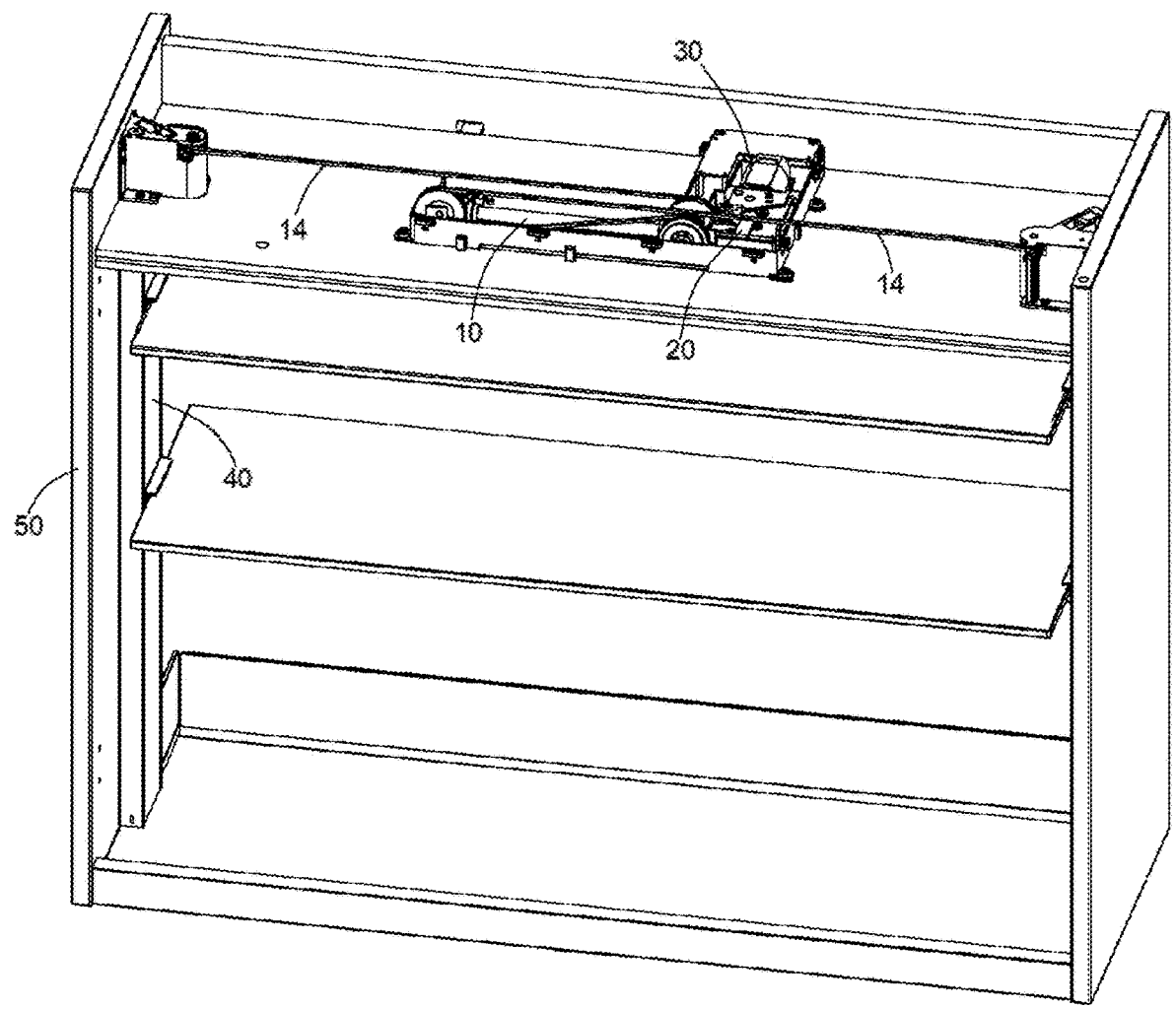
FIG. 3 is a structural schematic view of an embodiment of the lifting cabinet with the front cabinet door and roof removed according to the present invention.

As illustrated in FIG. 3, the lifting cabinet comprises a cabinet body 50 and a lifting shelf 40 sliding inside the cabinet body 50.

The upper space in the cabinet body 50 is partitioned to form an installation space where the power unit is arranged, two sets of steel wire ropes 14 extend out from the two sides of the installation space and connect to the two sides of the lifting shelf 40, for driving the lifting shelf to move up and down.

It will be appreciated that one skilled in the art may incorporate or combine different embodiments or examples, or technical features of different embodiments or examples disclosed in the description together if there are no contradictions.

In the description of the present invention, it should be understood that the terms "longitudinal", "lateral", "front", "back", "left", "right", "vertical", "horizontal", "top", "bottom", "inner", and "outer", etc., indicate direction or position relation based on the direction or position relation shown in figures, and is only for convenience of describing the present invention and simplifying the description, rather than indicating or implying that the indicated apparatus or parts must be configured or operated in specific direction. Therefore, these terms should not be deemed as a limit to the content protected by the present invention.

If the terms "first", "second", etc. are used herein to define a component, one skilled in the art should understand that usage of terms "first" and "second" is only for the convenience of describing the present invention and simplifying the description. Unless otherwise stated, the terms hereinbefore have no specific meanings.

The present invention is not limited to the above embodiments. Any variations or modifications without departing from the spirit and scope of the invention and within the scope of claims and equivalent technology of the present invention will be also contained in the present invention.

What is claimed is:

1. A transmission assembly of a lifting cabinet having a shelf with opposite lateral edges, comprising:
   a first transmission unit;
   the first transmission unit comprises a horizontally extending screw rod which is connected with
      a driving device, a sliding piece which is coupled to the screw rod, and a transmission wheel which is provided on the sliding piece and is configured to receive a flexible connecting piece;
   the sliding piece is connected to the opposite lateral edges of the shelf of the lifting cabinet; and
   the screw rod rotates under the action of the driving device, and drives the sliding piece to move horizontally back and forth along the screw rod in lateral directions, thereby the sliding piece drives the lifting shelf to move up and down.

2. The transmission assembly of the lifting cabinet according to claim 1, wherein a flexible connecting piece is coiled on the transmission wheel for connecting with the lifting shelf; when the transmission wheel moves along with the sliding piece, the lifting shelf is then driven by the flexible connecting piece to move up and down.

3. The transmission assembly of the lifting cabinet according to claim 2, wherein the transmission assembly further comprises a fixture which is secured inside the lifting cabinet; one end of the flexible connecting piece is secured to the fixture, and the other end is secured to the lifting shelf.

4. The transmission assembly of the lifting cabinet according to claim 3, wherein:
   a steering wheel is provided on the fixture;
   the transmission wheel is configured with two transmission wheels, and the flexible connecting piece is is configured with two sets of flexible connecting pieces, with one set of flexible connecting
      piece is coiled on each transmission wheel; wherein one of the sets of the flexible connecting pieces is coiled on the steering wheel to make a turn so that the two sets of flexible connecting pieces are oriented in opposite direction.

5. The transmission assembly of the lifting cabinet according to claim 1 further comprises:
   a second transmission unit, the input of which is connected with the driving device and the output is connected with the first transmission unit;
   the second transmission unit is used for receiving a first torque which is outputted from the driving device, and outputs a second torque to the first transmission unit according to the first torque;
   wherein the directions of the first torque and the second torque are different.

6. The transmission assembly claim 5 wherein the first and second torques are perpendicular to one another.

7. The transmission assembly of claim 5 wherein the second torque is greater than the first torque.

8. The transmission assembly of the lifting cabinet according to claim 5, wherein the second transmission unit comprises a second gear with first and second gear rings being coaxially arranged thereon;
   wherein the first gear ring is connected with the driving device, and the second gear ring is connected with a cone gear arranged on the screw rod.

9. The transmission assembly of the lifting cabinet according to claim 8, wherein a first gear is connected between the first gear ring and the driving device.

10. The transmission assembly of claim 1 wherein the connection between the sliding piece and the opposite lateral edges of the shelf is via a single pair of cables each extending to one of the opposite edges of the shelf.

11. A lifting cabinet, comprising:
    a body with a top, a bottom, and opposite left and right sides;
    a shelf slidably mounted between the sides for vertical movement and having opposite left and right ends;
    a single left cable and a single right cable, the cables having lower ends operatively connected to opposite ends of the shelf, respectively;
    a driver adjacent the top of the body and adapted to generate a rotary output;
    a transmission assembly adjacent the top of the body operatively connected to the rotary driver to
       receive the rotary output and convert the rotary output to a horizontal linear output, and being operatively connected to upper ends of the cables to extend and retract the cables upon actuation of the driver in opposite directions to lower and raise the shelf;
       wherein the transmission assembly comprises a horizontally extending screw rod, a threaded nut to move along the rod as the rod rotates and wheels on the nut configured to receive the cables.

12. The lifting cabinet of claim 11 wherein the transmission assembly further includes a fixture mounted to the cabinet and, wherein upper end of the cables are connected to the fixture and extend around the wheels.

13. The lifting cabinet of claim 11 wherein the nut is connecting to the shelf by the cables.

14. The lifting cabinet of claim 13 further comprising gears interconnecting the driver and the transmission assembly.

15. The lifting cabinet of claim 13 wherein the driver generates a torque and the transmission assembly generates an axial force greater than the torque.

16. The lifting cabinet of claim 15 wherein the torque has an axis perpendicular to the axial force.

17. The lifting cabinet of claim 13 wherein the driver and the transmission assembly are configured in an L-shape.

18. The lifting cabinet of claim 13 wherein the driver is a reversible electric motor.

19. The lifting cabinet of claim 12 further comprising a third wheel on the fixture, and one of the cables extending around the third wheel so that the lower ends of the cable extend to opposite sides of the body.

20. The lifting cabinet of claim 11 wherein the driver and the transmission assembly raises and lowers the shelf with no horizontal movement of the shelf.

\* \* \* \* \*